US012724452B2

(12) United States Patent
Koljonen

(10) Patent No.: US 12,724,452 B2
(45) Date of Patent: Sep. 1, 2026

(54) POCKET COMPUTER

(71) Applicant: Reino Koljonen, Lantana, FL (US)

(72) Inventor: Reino Koljonen, Lantana, FL (US)

( * ) Notice: Subject to any disclaimer, the term of this patent is extended or adjusted under 35 U.S.C. 154(b) by 0 days.

(21) Appl. No.: 19/202,270

(22) Filed: May 8, 2025

(65) Prior Publication Data

US 2025/0348109 A1 Nov. 13, 2025

Related U.S. Application Data

(60) Provisional application No. 63/644,146, filed on May 8, 2024.

(51) Int. Cl.
*G06F 1/16* (2006.01)
*G06F 21/32* (2013.01)

(52) U.S. Cl.
CPC .......... *G06F 1/1626* (2013.01); *G06F 1/1686* (2013.01); *G06F 1/169* (2013.01); *G06F 21/32* (2013.01)

(58) Field of Classification Search
CPC ..... G06F 1/1686; G06F 1/1647; G06F 1/3287
See application file for complete search history.

(56) References Cited

U.S. PATENT DOCUMENTS

| | | | | |
|---|---|---|---|---|
| 2017/0142239 | A1* | 5/2017 | Bae | G06F 1/1626 |
| 2017/0205854 | A1* | 7/2017 | Zenoff | G06F 1/1639 |
| 2018/0343755 | A1* | 11/2018 | Park | G06F 1/1652 |
| 2019/0005953 | A1* | 1/2019 | Bundalo | G06F 1/3287 |
| 2020/0081492 | A1* | 3/2020 | Wang | G06F 1/1626 |
| 2021/0098834 | A1* | 4/2021 | Nagao | H01M 10/465 |
| 2021/0310600 | A1* | 10/2021 | Sawaqedy | A45C 13/1069 |
| 2021/0318281 | A1* | 10/2021 | Kraemer | G01F 23/804 |

* cited by examiner

*Primary Examiner* — Kevin M Nguyen
(74) *Attorney, Agent, or Firm* — Malloy & Malloy, P.L.; Robert M. Downey

(57) ABSTRACT

A pocket computer includes an internal processor within a compact housing. An exterior of the housing includes a thumbprint reader for activating the compact computer including the various component features including a touch-screen display, fold-out support feet on opposite sides adjacent the bottom of the housing for supporting the pocket computer in an upright position, several high definition digital cameras, several video/image projectors, a microphone, an audio speaker and a number of connection ports including a mini HDMI port, USB ports, memory card slots and a charger connection port. A hook or ring on the top of the housing allows the pocket computer to be worn on a lanyard over the user's neck.

15 Claims, 8 Drawing Sheets

HOME
AUTOMOBILE
RADIO
TV - ANTENA
SMART RING
Internet

SATELLITE
10
RECEIVER
SMART
PHONE
CELLULAR SIGNAL
TOWER
ORAL TRANSCRIBER
DEVICE

POCKET COMPUTER

This non-provisional patent application is based on provisional patent application Ser. No. 63/644,146 filed on May 8, 2024.

BACKGROUND OF THE INVENTION

Field of the Invention

The present invention is directed to a compact computer that is generally the size of a smartphone and which includes a number of components and functional features such as a touchscreen display, a number of high definition digital cameras, several video/image projectors and numerous connection ports.

Description of the Related Art

Smartphones are commonplace and are used by virtually everyone in society for numerous purposes, but primarily for communications by both voice and text, as well as email, and for access to the internet. While smartphones do perform various computer functions and are able to operate a wide variety of computer mobile applications, even the most advanced smartphone fails to provide many different types of sophisticated computer functions that are capable with a desktop of laptop computer.

In the age of compact devices and the desire to carry sophisticated technology devices on one's person, either in a pocket or handbag, there remains a need for a highly sophisticated multifunctional computer that is capable of many functions not available with a smartphone. Moreover, there is a need for a pocket size computer device that provides numerous features and functions not found on even a desktop or laptop computer.

SUMMARY OF THE INVENTION

A pocket computer includes an internal processor within a compact housing. An exterior of the housing includes a thumbprint reader for activating the compact computer including the various component features including a touchscreen display, fold-out support feet on opposite sides adjacent the bottom of the housing for supporting the pocket computer in an upright position, several high definition digital cameras, several video/image projectors, a microphone, an audio speaker, an odor sensor, and a number of connection ports including a mini HDMI port, USB ports (or USB mini ports), memory card slots and a charger connection port. A hook or ring on the top of the housing allows the pocket computer to be worn on a lanyard over the user's neck.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
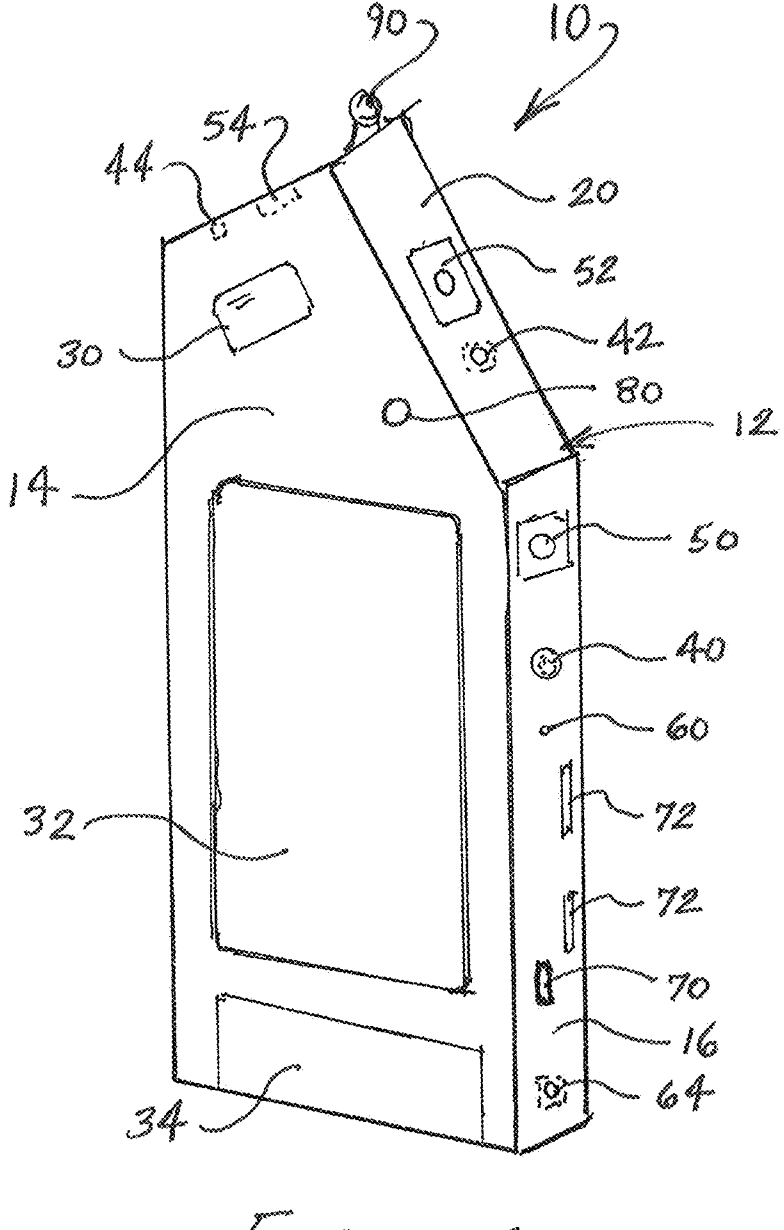
FIG. 1 is a front, right side perspective view of the pocket computer of the present invention.
Figure 2:
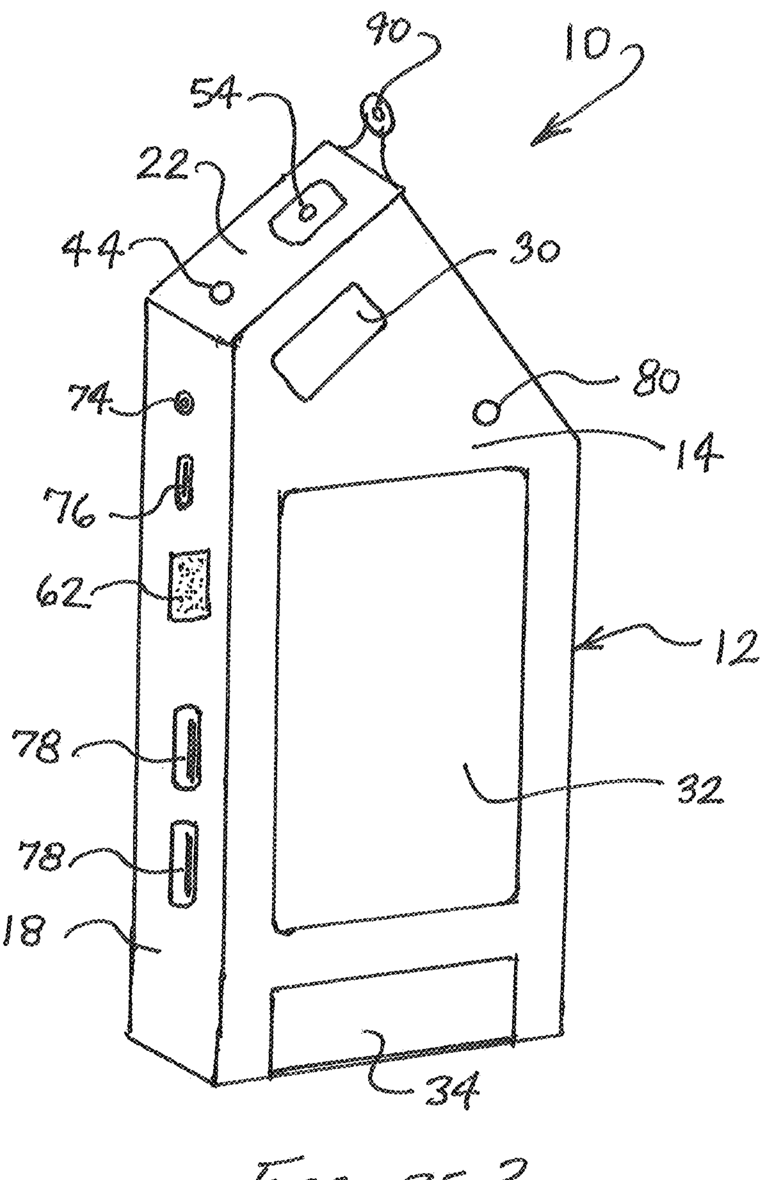
FIG. 2 is a front, left side elevational view of the pocket computer of the present invention.

Referring to the several views of the drawings, and initially FIGS. 1 and 2, the pocket computer of the present invention is shown and is generally indicated as 10. The pocket computer 10 includes a housing 12 with a front face 14, a right side panel 16, a left side panel 18, an angled right top panel 20 and an angled left top panel 22.

Figure 3:
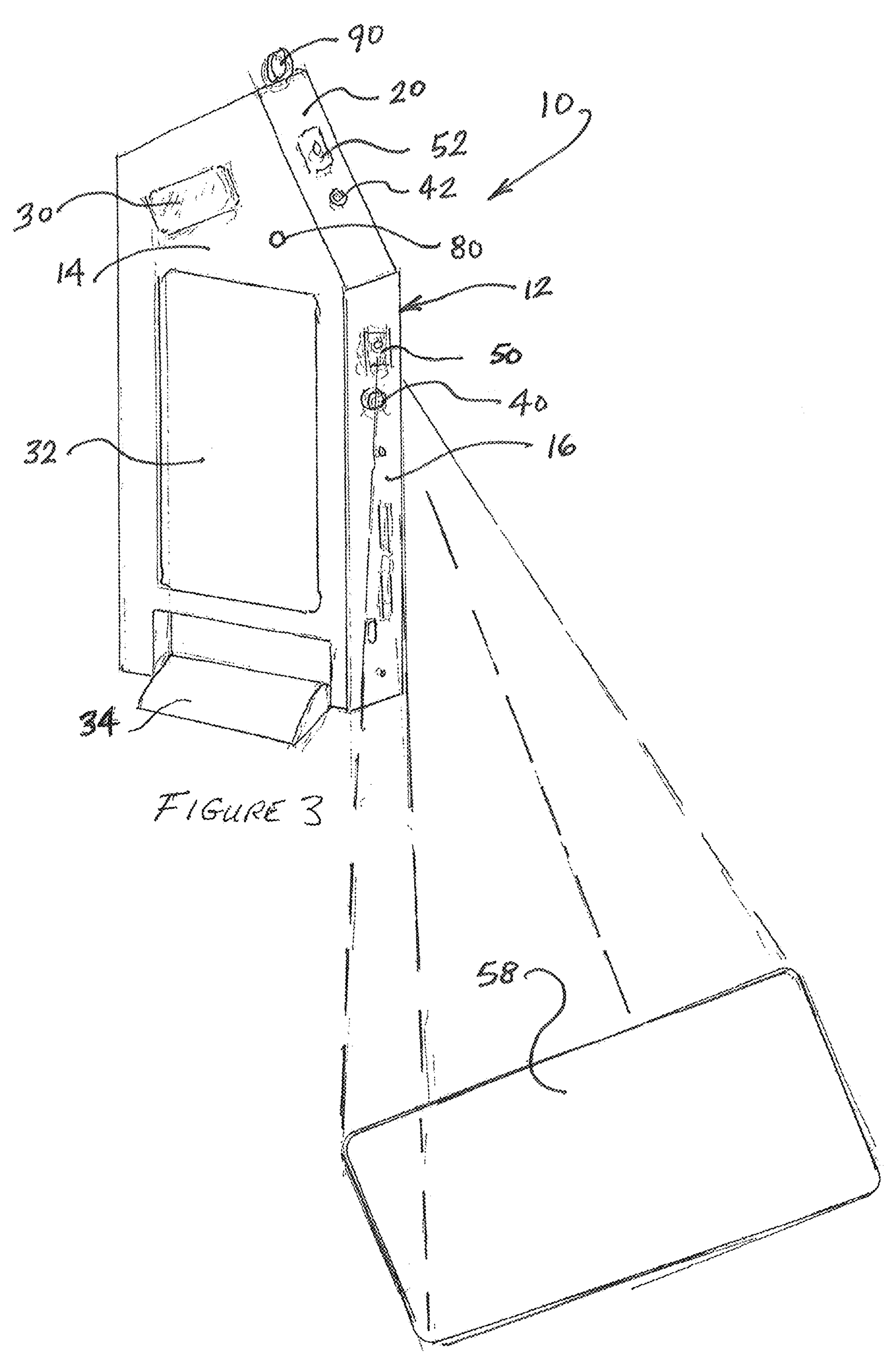
FIG. 3 is a front, right side perspective view of the pocket computer of the present invention showing an image being projected from a projector on the side of the device onto a surface, and wherein the pocket computer is shown with support feet folded out to an operable position to support the device in an upright position on a surface such as a table, desk or a countertop.
Figure 4A:
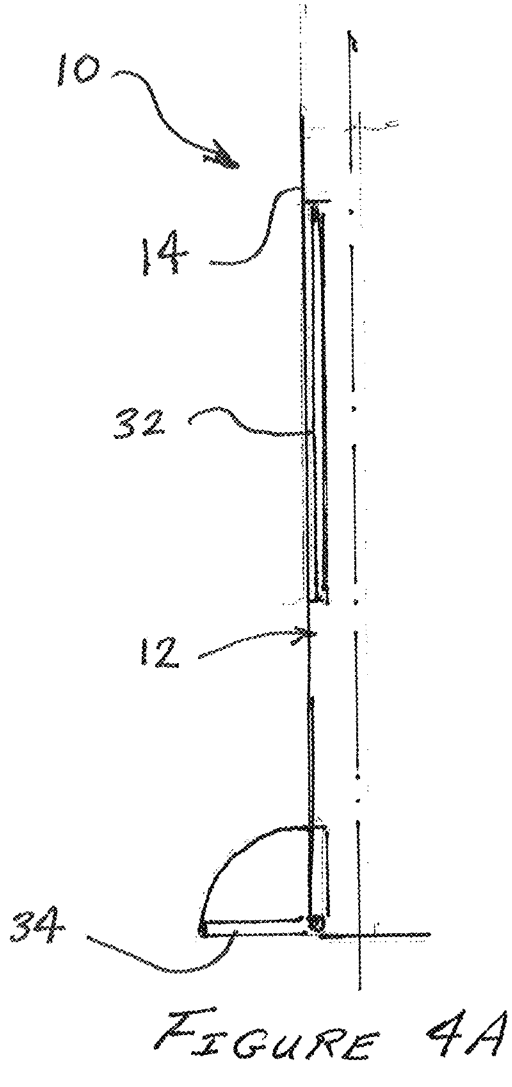
FIG. 4A is a side elevational view showing a front half of the pocket computer device to illustrate the fold-out support feet on the front side of the pocket computer deployed in the operable position to support the pocket computer device in an upright position.
Figure 4B:
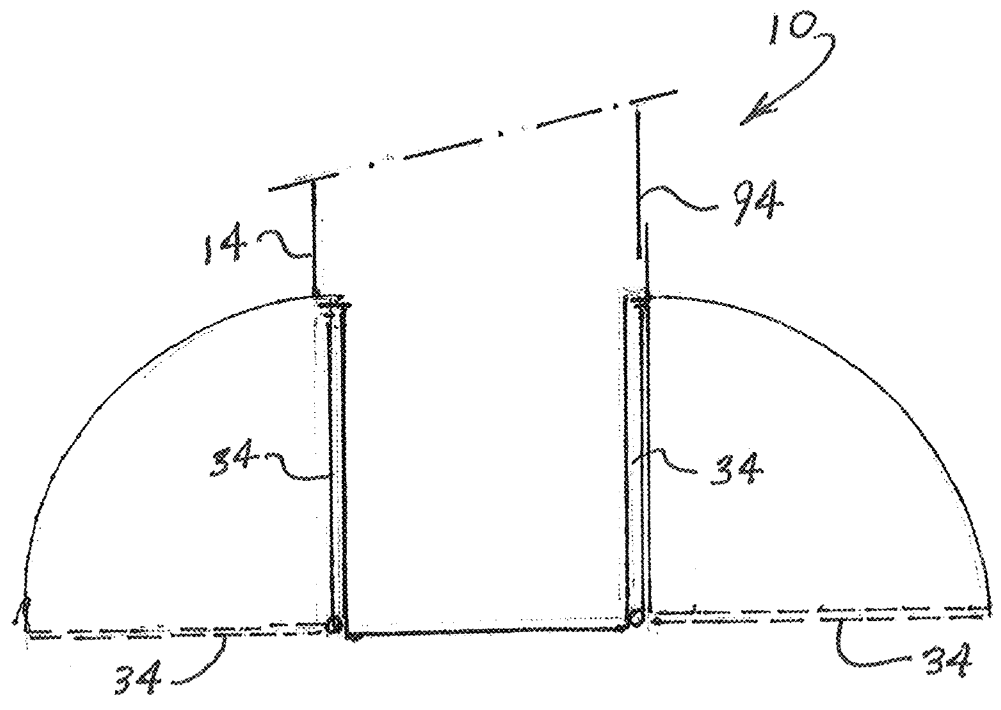
FIG. 4B is an isolated side elevational view of a lower portion of the pocket computer device showing the fold-out support feet on opposite sides of the pocket computer device deployed to the operable position to support the device in the upright position.

The front face 14 of the pocket computer includes a thumbprint/fingerprint reader (scanner) for reading the user's thumbprint/fingerprint that is stored in memory in order to thereby activate the pocket computer device and its various components, functions and features. In particular, the activation of the compact computer includes activation of a touchscreen display 32 that functions much like the touchscreen of a typical smartphone. Activation of the pocket computer 10 using the thumbprint/fingerprint reader further releases fold-out support feet 34 on each side of the housing 12 to support the housing 12 in an upright position, as seen in FIG. 3 and FIGS. 4A-4B. When the device is turned off or when it is desired to simply not use the fold-out support feet, the fold-out support feet are folded back up to the stowed position, as seen in FIGS. 1 and 2, and locked in the closed, stowed position.

The pocket computer 10 further includes several high definition digital cameras, much like those found on a smartphone, including a first camera 40 on the right side panel 16, a second camera 42 on the right angled top side 20 and a third camera 44 on the left top panel 22. Additionally, the pocket computer includes several video/image projectors including a first projector 50 on the right side panel 16, a second projector 52 on the right top panel and a third projector 54 on the left top panel. Each of the projectors, 50, 52, 54 is structured for projecting an image 58 (see FIG. 3) onto a surface, such as a wall, desktop, countertop or glass surface (e.g., a windshield of an automobile). Various uses of the projectors 50, 52 and 54 are described further hereinafter.

The pocket computer 10 further includes a microphone 60 on the right side panel 16 and an audio speaker 62 on the left side panel 18. A laser pointer 64 is provided on the right side panel as well. Numerous connection ports are provided on the housing including a charger connection port 70, memory card slots 72, a landline connection port 74, a mini HDMI port/adapter port 76 and several USB ports 78. The USB ports may be mini ports to accept an adapter that allows a standard size USB connection. An odor sensor 80 is provided on the exterior of the housing of the pocket computer for sensing various odors including toxic gasses, as well as food and perfume odors. A hook or ring 90 on the top of the housing allows the pocket computer to hang on a lanyard that can be worn over the user's neck so that the pocket computer is presented on the front torso (e.g., the chest) of the user. This can be useful when attending professional conferences or seminars or other events where the user's identification may be necessary or beneficial. More particularly, the user's name and other identification, as well as a photo may be presented on the touchscreen display and remain locked in the display mode during the event, or at least at entry into an event or venue for security purposes.

Figure 5:
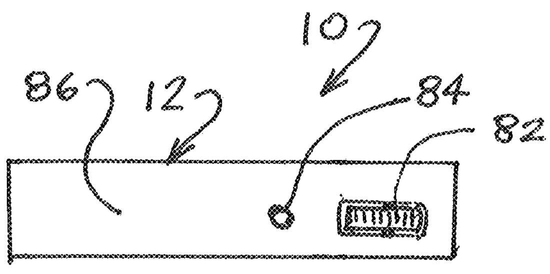
FIG. 5 is a bottom plan view of the pocket computer showing a scroller wheel and mouse sensor on the bottom side of the housing for providing computer mouse functions such as cursor movement on the display.

Referring to FIG. 5, a bottom 86 of the pocket computer 10 includes a scroller wheel 82 and a mouse sensor 84 for moving a cursor on the touchscreen display, much like the mouse function of a desktop or laptop computer.

Figure 6A:
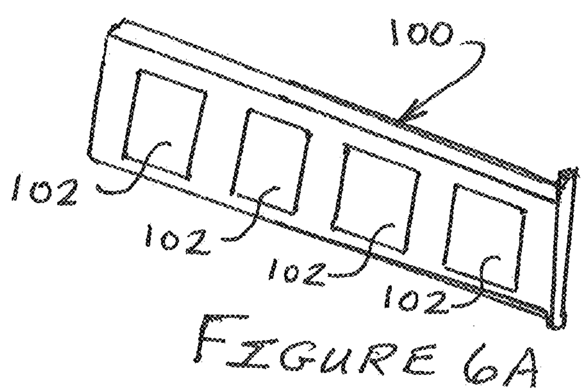
FIG. 6A is a perspective view showing a memory card having a plurality of memory chips thereon for insertion within a memory card slot on the side of the pocket computer.
Figure 6B:
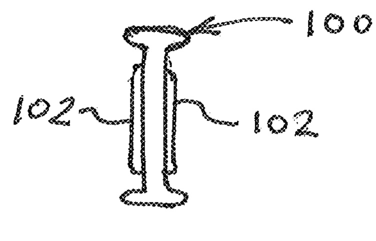
FIG. 6B is an end elevational view of the memory card of FIG. 6A and showing the memory chips on opposite sides of the memory card.

As seen in FIG. 6, memory cards 100 are adapted to be inserted into the memory card slots 72 (see FIG. 1). Each of the memory cards includes four memory chips 102 on each side (a total of eight memory chips per memory card). In an example of the invention, each memory chip may have a memory capacity of 1 terabyte, thereby providing a total of eight terabytes of memory on the memory card. In this example, with the use of the two memory cards 100, there is a total memory card capacity of 16 terabytes.

Figure 7:
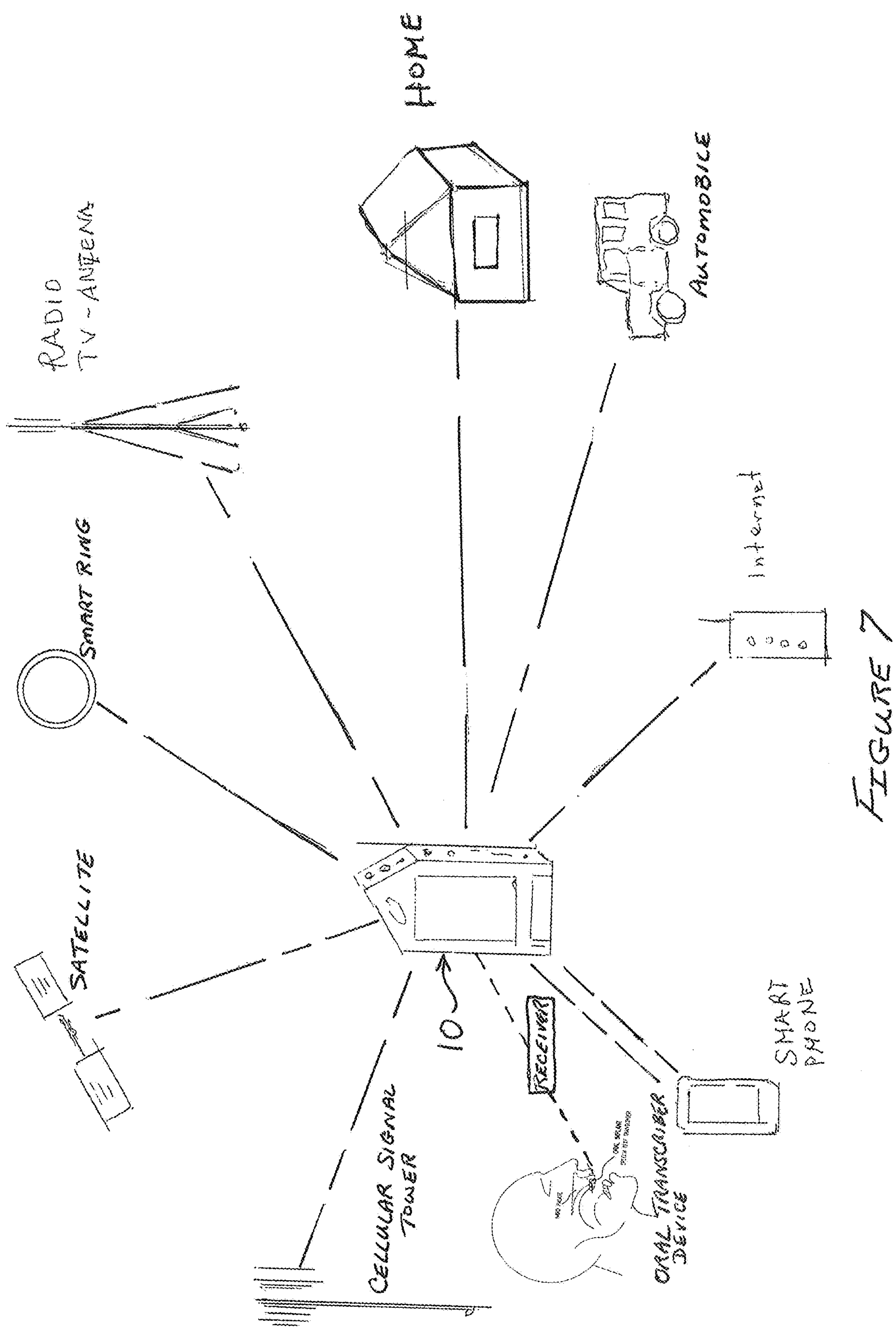
FIG. 7 is a schematic diagram illustrating a wireless network for allowing the pocket computer to communicate with various other wireless devices and the Internet.

Referring to FIG. 7, the pocket computer 10 is able to wirelessly link to a network to thereby communicate and exchange data and control functions of a smartphone, various devices in an automobile, and numerous devices in a home. The pocket computer 10 can further connect to the Internet much like a smartphone, laptop computer or desktop computer. Communication with these various devices is achieved through a wireless connection to cellular signal towers, satellite, and radio/TV antennae. The pocket computer 10 can further communicate with a smart ring, such as the AURA ring, as well as an orally mounted wireless transcriber, as disclosed in U.S. Pat. No. 7,629,987 B2.

Figure 8:
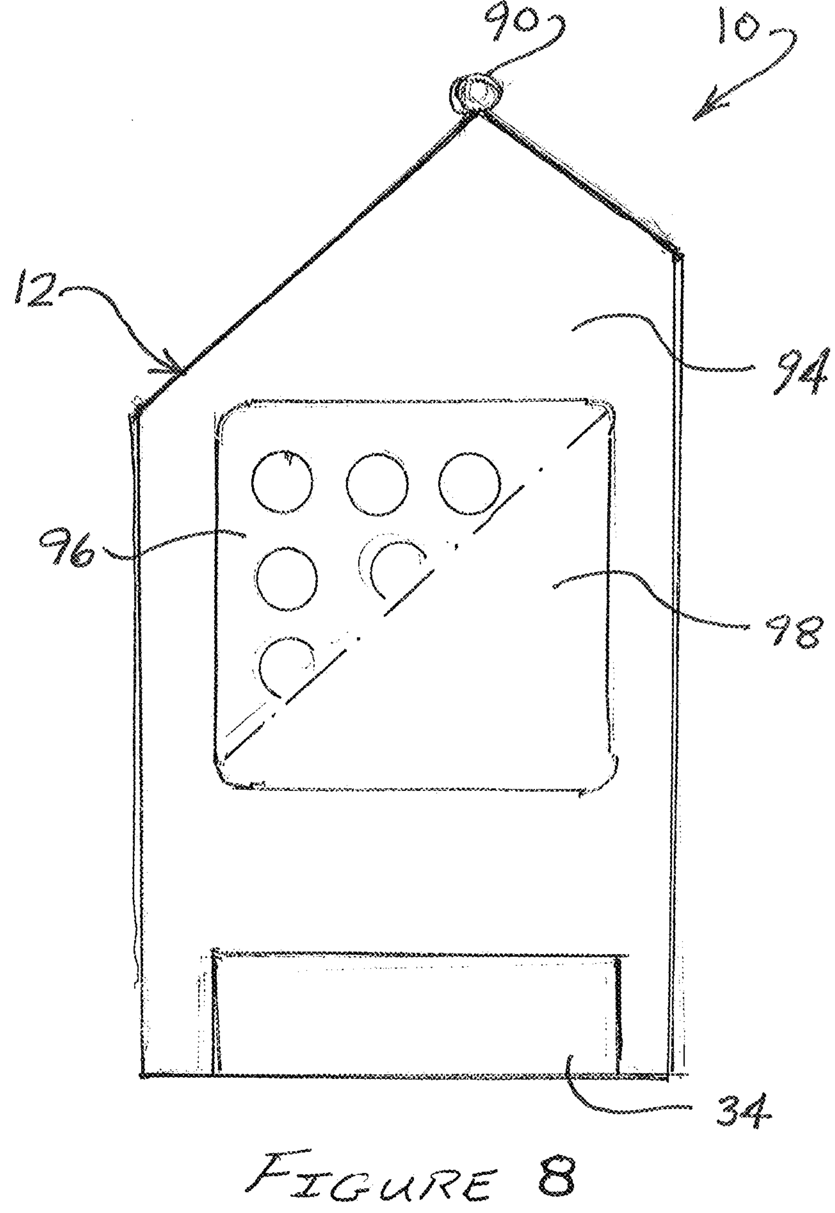
FIG. 8 is a rear elevational view of the pocket computer device showing a solar panel and touchscreen on the back side of the device.

Referring to FIG. 8, a back side 94 of the pocket computer device 10 includes a touchscreen panel 96 that can present letters and numbers, for functions such as a clock, calculator or phone. The touchscreen panel is covered with a solar panel 98 that allows for recharging of an internal battery source of the pocket computer device 10, as well as maintaining or prolonging the charge during daily use and operation of the pocket computer device 10.

The pocket computer 10 of the present invention provides the following features and functions:

Alarm clock

Wireless activation of other devices such as a coffee machine

Cookbook—displays recipes and cooking demonstrations that can be projected by the projector onto a surface, such as a kitchen counter or wall Weather reports—projected weather forecasts by the projector onto a surface such as a wall, desk or countertop Ability to store credit cards and any type of membership cards such as automobile association cards, roadside service, auto insurance, country club membership cards, etc.

Stores contact information for home services such as plumbers, electricians, AC repair and service, etc.

Provides diet and exercise information, including suggested diets and exercise routines, as well as the user's current diets, calories consumed, and calories burned during exercise Can remind user to perform daily tasks such as brushing one's teeth—may have the ability to inform the user that they did not brush their teeth yet for that morning and/or evening Can store and contact ride services such as Uber or Lyft Lottery tickets—ability to remotely purchase lottery tickets in various states Can possibly provide lottery scratch tickets that are projected onto a surface with the user contacting areas on the surface to display winning numbers much like on a scratch off lottery ticket Car rental services—can contact various car rental services including private owner car rental services Includes a sensor that can identify odors, such as a toxic or poisonous gas (e.g., carbon dioxide) in enclosed areas such as a subway or underground metro transit. Can also detect perfumes/cologne and can identify the perfume worn by a person, and may also identify people by a stored odor that specifically identifies the person Ability to check DNA of persons—can test saliva or maybe hair samples and determine DNA—can be used to identify the owner of the pocket computer, as well as for use as a crime investigation tool Can test vitals such as blood pressure, heart rate, blood sugar level Navigation—automobile navigation, may have a map projected onto the windshield of the automobile when driving and provide instructions to the driver such as when to make a turn or merge into another lane, or when the appropriate exit on a highway is approaching Medications—can display medications that the user is presently taking and which medications have already been taken for the day and what still remains to be taken, also providing a list of the medications and dosages for medical personnel Home security system—can connect to security cameras, can also connect to a camera in a refrigerator to see what food items remain in the refrigerator, May activate lights in the refrigerator temporarily in order to view the food items Smart home system—ability to turn on lights, AC, raise and lower window shades, preheat oven, etc.

Food shopping—can inform the user that they need specific items, such as milk, butter, etc. and tracks previous purchases of items such as milk, meat, etc. and will advise user when these items have expired and remind the person to purchase fresh items, such as milk, etc.

Can detect presence or location of another person, e.g., a person having a restraining order against another person and will advise if that other person is within an unacceptable range according to a restraining order Can track personal property, and remind user if they loan items to others to retrieve them, such as clothing, tools and equipment Can project sample colors on a wall or other surface such as when trying to choose a paint color for painting a wall or other surface. Can also project nail polish colors onto the user's nail to visualize various colors on one's nails before purchasing nail polish Can show architectural plans that are projected onto a wall or other surface. Can easily move items in the architectural plans, such as walls, doors, counters, etc. when talking to a client to make revisions to architectural plans Can play various games such as checkers, chess, as well as view sporting events such as ice hockey, football, tennis, basketball, baseball, etc. all of which may be projected onto a table surface for viewing and moving game pieces Can project school projects or homework onto a surface or a paper, such as practicing handwriting wherein the letters and numbers are projected onto a paper and a child can trace the letters or numbers on the paper with a pen or pencil following the outline of projected images of those letters and numbers Can be used to track location of personal items such as a purse, luggage or briefcase Can detect abnormal inflections in voices, and thus identify if a person is telling the truth or lying, i.e., when a person is lying they tend to change their voice tempo and tone and this can be detected by the pocket computer for purposes of determining truthfulness Can store all types of personal information such as DNA, social security number, birthdays, etc.

Can be used for transferring money between banks or other financial institutions and allow the user to shop for the best loans, such as car loans or mortgages Can be used to shop for the best price from service providers, such as cellphone services or cable/satellite services Can be used for shopping for automobiles to identify the best prices and availability of different models, etc.

Can project a keyboard onto a surface and use as a virtual keyboard to type, therefore do not need to have an actual physical keyboard or mouse Can accept a wireless transceiver device that plugs into a port on the side of the pocket computer to wirelessly connect a keyboard, mouse or other wireless device Fold-out feet support the device in the standing upright vertical position—can have solar panels on the fold-out feet for charging the pocket computer or at least provide supplemental power during use Can use to pay a bill, such as at a restaurant or retail store via a digital wallet app Can use to buy and sell cryptocurrency Can buy and sell stock on stock exchange Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A pocket computer comprising:

a housing having a front face, a back face, a bottom panel, opposite side panels, and first and second top panels disposed at an angle relative to one another, and the first and second top panels disposed at an angle relative to an adjacent one of the side panels at an angle of less than 90 degrees;

a touchscreen display on the front face;

at least one high definition digital camera on at least one of the first and second top panels;

at least one projector on at least one of the first and second top panels;

a microphone on the housing;

at least one audio speaker;

a plurality of connection ports accessible on the exterior of the housing including at least one USB port, and at least one HDMI port;

a charger connection port;

a biometric sensor configured to authenticate a user and allow operation and use of the pocket computer; and first and second support feet on the housing and structured and disposed to move between a stowed position flush with the front face and the back face and a deployed, operable position wherein the support feet are extended out perpendicular to the front face and the back face on opposite sides of the housing and adjacent to the bottom panel for supporting the pocket computer in an upright position, and wherein the first and second support feet are configured to automatically release from the stowed position to the deployed, operable position in response to user authentication via the biometric sensor.

2. The pocket computer as recited in claim 1 wherein the HDMI port is a mini HDMI port.

3. The pocket computer as recited in claim 1 further comprising an odor sensor on the housing.

4. The pocket computer as recited in claim 1 wherein the biometric sensor is a fingerprint scanner on an exterior of the housing for recognizing a user's fingerprint.

5. The pocket computer as recited in claim 1 further comprising a laser pointer on an exterior of the housing.

6. The pocket computer as recited in claim 1 further comprising a touchscreen display on the back face of the housing.

7. The pocket computer as recited in claim 6 further comprising a solar panel covering the touchscreen display on the back face for recharging an internal power source of the pocket computer.

8. A pocket computer comprising:

a housing having a front face, a back face, a bottom panel, opposite side panels, and first and second top panels disposed at an angle relative to one another, and the first and second top panels disposed at an angle relative to an adjacent one of the side panels at an angle of less than 90 degrees;

a touchscreen display on the front face;

at least one high definition digital camera on at least one of the first and second top panels;

at least one projector on at least one of the first and second top panels;

an odor sensor disposed on the housing;

a laser pointer on an exterior of the housing;

a microphone on the housing;

at least one audio speaker;

a plurality of connection ports accessible on the exterior of the housing including at least one USB port, and at least one HDMI port;

a charger connection port;

a biometric sensor configured to authenticate a user and allow operation and use of the pocket computer; and first and second support feet on the housing and structured and disposed to move between a stowed position flush with the front face and the back face and a deployed, operable position wherein the support feet are extended out perpendicular to the front face and the back face on opposite sides of the housing and adjacent to the bottom panel for supporting the pocket computer in an upright position, and wherein the first and second support feet are configured to automatically release from the stowed position to the deployed, operable position in response to user authentication via the biometric sensor.

9. The pocket computer as recited in claim 8 wherein the HDMI port is a mini HDMI port.

10. The pocket computer as recited in claim 8 further comprising an odor sensor on the housing.

11. The pocket computer as recited in claim 8 wherein the biometric sensor is a fingerprint scanner on an exterior of the housing for recognizing a user's fingerprint.

12. The pocket computer as recited in claim 8 further comprising a touchscreen display on the back face of the housing.

13. The pocket computer as recited in claim 12 further comprising a solar panel covering the touchscreen display on the back face for recharging an internal power source of the pocket computer.

14. A pocket computer comprising:

a housing having a front face, a back face, a bottom panel, opposite side panels, and first and second top panels disposed at an angle relative to one another, and the first and second top panels disposed at an angle relative to an adjacent one of the side panels at an angle of less than 90 degrees;

a touchscreen display on the front face;

at least one high definition digital camera on at least one of the first and second top panels;

at least one projector on at least one of the first and second top panels;

an odor sensor disposed on the housing;

a laser pointer on an exterior of the housing;

a microphone on the housing;

at least one audio speaker;

a plurality of connection ports accessible on the exterior of the housing including at least one USB port, and at least one HDMI port;

a charger connection port;

a touchscreen display on the back face of the housing;

a solar panel covering the touchscreen display on the back face of the housing for charging an internal power source of the pocket computer;

a biometric sensor configured to authenticate a user and allow operation and use of the pocket computer; and first and second support feet on the housing and structured and disposed to move between a stowed position flush with the front face and the back face and a deployed, operable position wherein the support feet are extended out perpendicular to the front face and the back face on opposite sides of the housing and adjacent to the bottom panel for supporting the pocket computer in an upright position, and wherein the first and second support feet are configured to automatically release from the stowed position to the deployed, operable position in response to user authentication via the biometric sensor.

15. The pocket computer as recited in claim 14 wherein the biometric sensor is a fingerprint scanner on an exterior of the housing for recognizing a user's fingerprint.

* * * * *